(12) United States Patent
Black et al.

(10) Patent No.: US 11,599,756 B1
(45) Date of Patent: *Mar. 7, 2023

(54) FLEXIBLE FOLDABLE CHIP CARD WITH IMPROVED SECURITY

(71) Applicant: UIPCO, LLC, San Antonio, TX (US)

(72) Inventors: Robert Lee Black, San Antonio, TX (US); Matthew Ryan Santacroce, Rio Rancho, NM (US); Andre Rene Buentello, San Antonio, TX (US); Jose L. Romero, Jr., San Antonio, TX (US); Timothy Blair Chalmers, San Antonio, TX (US); Samip Dilip Mehra, Peoria, AZ (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/505,879

(22) Filed: Oct. 20, 2021

Related U.S. Application Data (63) Continuation-in-part of application No. 17/017,779, filed on Sep. 11, 2020, now Pat. No. 11,182,663.

(60) Provisional application No. 62/899,368, filed on Sep. 12, 2019.

(51) Int. Cl.
| | |
|---|---|
| *G06K 19/06* | (2006.01) |
| *G06K 19/02* | (2006.01) |
| *G06K 19/077* | (2006.01) |
| *G06K 19/073* | (2006.01) |
| *G06K 19/07* | (2006.01) |

(52) U.S. Cl.
CPC ....... *G06K 19/025* (2013.01); *G06K 19/0717* (2013.01); *G06K 19/07327* (2013.01); *G06K 19/07771* (2013.01)

(58) Field of Classification Search
CPC ...... G06K 9/00; G06K 9/00154; G06K 19/07; G06F 21/32; G06F 21/35
USPC .......................................... 235/488, 497, 492
See application file for complete search history.

(56) References Cited

U.S. PATENT DOCUMENTS

| | | | | |
|---|---|---|---|---|
| 6,032,866 | A * | 3/2000 | Knighton | G06F 1/1684 235/472.01 |
| 7,721,956 | B2 * | 5/2010 | Williams | G06K 19/04 235/487 |
| 11,182,663 | B1 * | 11/2021 | Black | G06K 19/02 |
| 2009/0087651 | A1 * | 4/2009 | Doublet | B32B 27/14 428/473.5 |

(Continued)

FOREIGN PATENT DOCUMENTS

JP 2005346549 * 12/2005 ............. G06K 19/00

*Primary Examiner* — Daniel Cyr
(74) *Attorney, Agent, or Firm* — Plumsea Law Group, LLC (57) ABSTRACT

A flexible chip card such as a credit card or a debit card that incorporates a protective layer that precludes unauthorized access to the chip in the chip card. The protective layer is a highly conductive layer that shields the chip and prevents electromagnetic waves that may be emitted by an illicit device from accessing the chip. This protective layer thus prevents any unauthorized persons from obtaining confidential information from the chip card that may then be used to consummate fraudulent transactions or conduct other illicit activities. In one embodiment, the flexible chip card includes one or more stiffening structures to provide rigidity to the chip card.

20 Claims, 7 Drawing Sheets

(56) References Cited

U.S. PATENT DOCUMENTS

| | | | |
|---|---|---|---|
| 2015/0017819 A1* | 1/2015 | Bolotin | H05K 5/0278 |
| | | | 439/31 |
| 2016/0041046 A1* | 2/2016 | Pagani | G01L 1/144 |
| | | | 73/862.626 |
| 2017/0264888 A1* | 9/2017 | Valentine | H04N 13/31 |
| 2019/0012000 A1* | 1/2019 | Cavallaro | G06F 1/1626 |

* cited by examiner

FLEXIBLE FOLDABLE CHIP CARD WITH IMPROVED SECURITY

CROSS-REFERENCE TO RELATED APPLICATIONS

This application is a continuation in part of and claims priority to U.S. patent application Ser. No. 17/017,779, filed on Sep. 11, 2020 and titled "Foldable Chip Card With Improved Security", which application claims the benefit of U.S. Provisional Patent Application No. 62/899,368, filed Sep. 12, 2019, and titled "Foldable Chip Card With Improved Security," the disclosure of which applications are incorporated by reference herein in their entirety.

TECHNICAL FIELD

This disclosure relates generally to systems and methods for preventing access to chip cards such as credit cards, debit cards and identity cards by unauthorized persons.

BACKGROUND

Chip cards such as credit cards and debit cards, for example, are designed to be read by chip readers in payment terminals at, for example, retailers, banks and other institutions. Also, identity cards containing chips may be read by devices at entry points to limited-access facilities to allow access to those facilities only to authorized persons. When a chip card is inserted into a payment terminal, the chip provides instructions to the payment terminal, which then combines information stored in the chip with information in the payment terminal to create a unique encrypted code. This encrypted code is then used to authorize the transaction, either online over the Internet or within the payment terminal itself.

These chip cards provide better protection against some forms of credit card or debit card fraud than, for example, the cards with a magnetic strip that had been used prior to the introduction of the chip cards. However, since chip cards are designed to be read by chip readers in payment terminals, there is a potential for exposure to illicit devices that might emulate a chip reader to obtain information and/or instructions stored on the chip cards. For these reasons, there is a need for protecting chip cards from being accessed by illicit devices.

SUMMARY

In one aspect, embodiments include a chip card comprising a first portion of the chip card and a second portion of the chip card. The chip card also has a flexible portion that joins the first portion of the chip card to the second portion of the chip card, such that the first portion of the card can be folded over the second portion of the card. The first portion of the chip card, the second portion of the chip card and the flexible portion of the chip card each has an exterior surface. A chip embedded in the second portion of the card is configured to be read by a chip reader. The chip card also has a highly conductive protective layer adjoining the exterior surfaces of the first portion of the chip card, and adjoining the second portion of the chip card, and also adjoining the flexible portion of the chip card.

In another aspect, embodiments include a chip card that has a first portion with a first portion of a protective conductive layer on its exterior surface, a second portion of with a second portion of the protective conductive layer on its exterior surface and a flexible portion joining the first portion of the chip card to the second portion of the chip card. The flexible portion has a flexible portion of the protective conductive layer on its exterior surface. There is a chip embedded in the second portion of the chip card that is configured to be read by a chip reader. When the first portion of the chip card is folded over the second portion of the chip card, the protective conductive layer extends from a first end of the chip card over the first portion of the chip card, over the flexible portion of the chip card and over the second portion of the chip card to a second end of the chip card.

In yet another aspect, embodiments include a chip card configured to provide enhanced protection from unauthorized access to the chip card. The chip card has an embedded chip, which is configured to be read by a chip reader. The chip card has three portions: a first portion covered by a first highly conductive protective layer on its exterior surface, a second portion covered by a second highly conductive protective layer on its exterior surface, and a third flexible portion joining the first portion to the second portion. The chip is embedded in the second portion of the chip card such that when the first portion of the chip card is folded over the second portion of the chip card, the chip is protected from access by electromagnetic waves by at least one of the first highly conductive protective layer and the second highly conductive protective layer.

BRIEF DESCRIPTION OF THE DRAWINGS

The embodiments disclosed herein may be better understood with reference to the following listed drawings and their descriptions. The components in the drawings are schematic rather than representational, and are not necessarily to scale, the emphasis of the disclosure being placed upon illustrating the purpose of implementing the systems and methods disclosed herein. Moreover, in the drawings, like reference numerals designate corresponding parts throughout the drawings.

DESCRIPTION OF EMBODIMENTS

The embodiments disclosed herein provide systems and methods for protecting users of chip cards by preventing unauthorized access to the chip in their chip cards by persons using illicit devices to obtain information from the chip cards. Typically, chip cards are designed to communicate with chip readers in payment terminals using Near-Field Communication (NFC) technology. Unauthorized persons may use a device that emulates chip readers (such as those used in payment terminals or at entry points to limited-access facilities, for example) to interrogate chips in chip cards. Using these illicit devices, these persons may then be able to obtain sufficient information to then successfully consummate fraudulent transactions. Such fraudulent transactions may victimize the owner of the chip card, the institution that issued the chip card, or third parties. Moreover, in some cases the unauthorized person may be attempting to steal confidential information not necessarily to consummate a fraudulent transaction but for other illegal purposes such as to gain access to a limited-entry facility, for example.

As used herein, credit cards, debit cards, identity cards and other kinds of cards that incorporate chips that may be read by a chip reader or similar device will be referred to herein as "chip cards." For convenience, the information, instructions or other data stored on the chip card will be referred to herein as "confidential data." Also, for convenience, persons attempting to obtain confidential data by accessing another person's chip card using illicit devices will be referred to herein as "unauthorized persons." Also, although for convenience the embodiments described herein are described as using NFC electromagnetic waves, the embodiments are not restricted to NFC technology or NFC electromagnetic waves, but are representative of devices that may use any applicable electromagnetic waves operating at any effective frequency to access chips in chip cards. Finally, the term "highly conductive layer" shall mean a layer that is sufficiently conductive that it will reflect electromagnetic waves directed at the layer, and will not allow a sufficient or effective intensity or amplitude of such waves to reach a chip embedded in a chip card protected by such a highly conductive layer with sufficient intensity to activate any of the circuits embedded in the chip card.

Briefly, the embodiments disclosed herein provide a highly conductive layer at the exterior surface of the chip card that functions as a shield that protects the chip from unauthorized access by illicit devices emitting electromagnetic waves, whether at the NFC frequency of 13.56 MHz or at other frequencies. The exterior surface of the chip card is a surface that is opposite to the surface that displays the chip. The highly conductive layer prevents penetration of the electromagnetic waves into the chip card, such that they cannot reach the chip itself, and therefore cannot extract any information or instructions from the chip. Essentially, the electromagnetic waves are reflected and/or scattered by the shield instead of being transmitted into the chip or towards the chip.

FIG. 1A, FIG. 1B, FIG. 2A and FIG. 2B illustrate two typical scenarios showing how an unauthorized person may obtain information, instructions or other confidential data from a chip card using an illicit device that emulates a conventional chip reader. In the illustration 100 shown in FIG. 1A, and the blow-up in FIG. 1B, an unauthorized person 102 holding an illicit device 112 is standing to the right of a customer 106 standing in line at a grocery store, waiting his turn as a person in front of him is loading groceries onto the conveyor belt at the cash register. Illicit device 112 contains an emulator that emulates the functions and characteristics of a chip reader in a payment terminal or entry point device, for example. For example, illicit device 112 may be using the NFC frequency of 13.56 MHz if that is the frequency used by chip readers in the region. The customer 106 is holding his chip card 108 at his side. The unauthorized person 102 is holding his illicit device 112 in close proximity to chip card 108 such that electromagnetic waves 110 are close enough to chip 104 in chip card 108 to energize and interrogate chip 104.

Figure 1A:
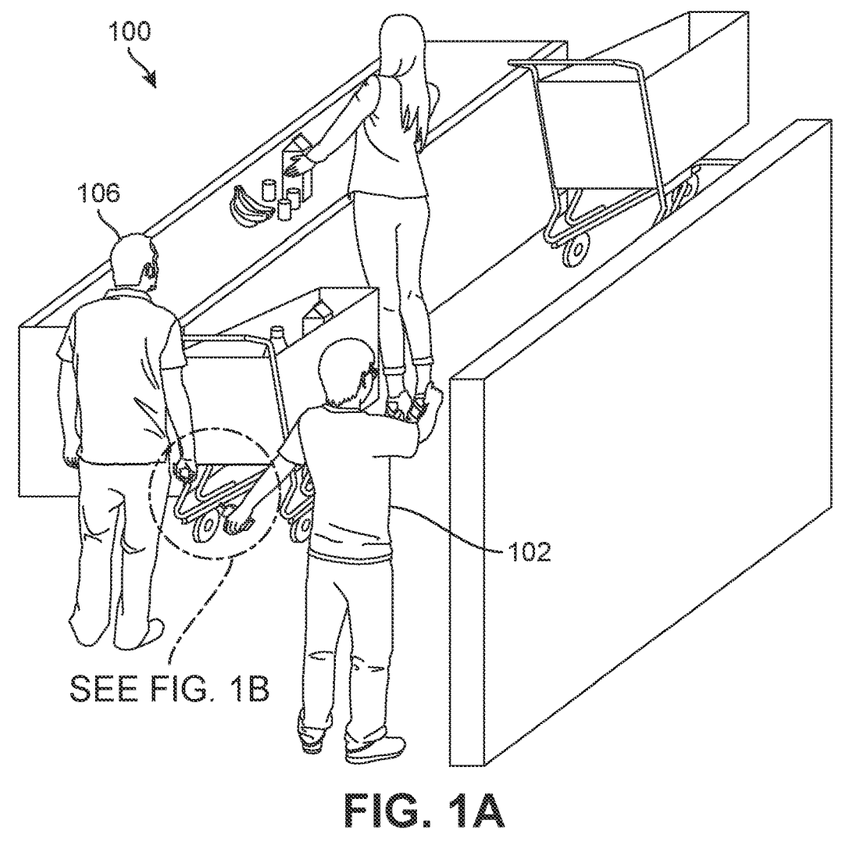
FIG. 1A and FIG. 1B illustrate a typical scenario in which information stored on a chip card may be accessed by an unauthorized person using an illicit device.
Figure 1B:
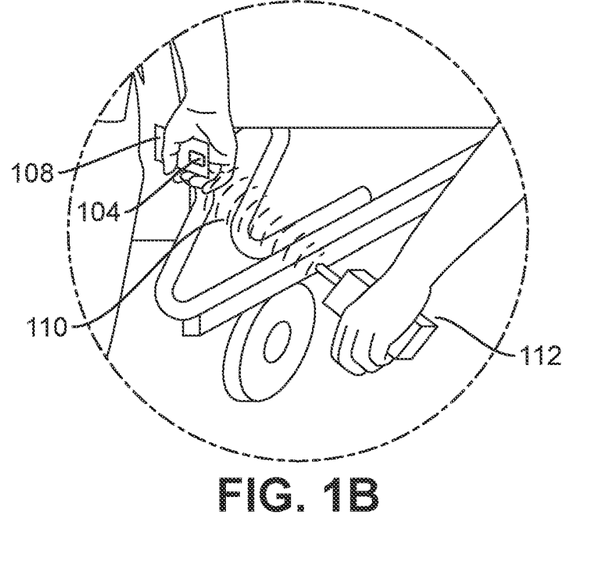

In this scenario illustrated in FIG. 1A and FIG. 1B, illicit device 112 has a clear unobstructed path to chip 104 in chip card 108. However, in many instances illicit device 112 may not need such a clear unobstructed path, because typical clothing, wallets or purses most often do not present a significant obstacle to electromagnetic waves. Also, illicit device 112 may emit its electromagnetic waves at a higher amplitude and intensity than do typical commercial chip readers, such that these more powerful electromagnetic waves can more readily penetrate through non-conductive obstacles such as vinyl, cloth or leather.

Figure 2A:
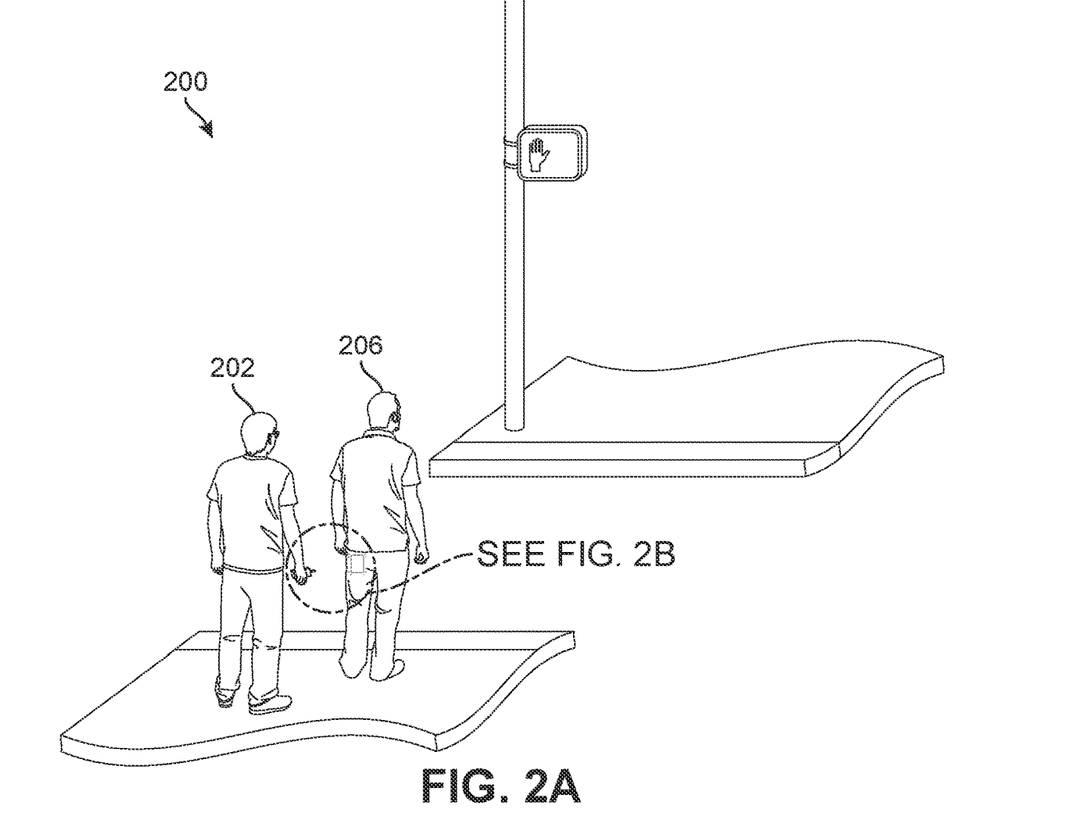
FIG. 2A and FIG. 2B illustrate another scenario in which information stored on a chip card may be accessed by an unauthorized person using an illicit device.
Figure 2B:
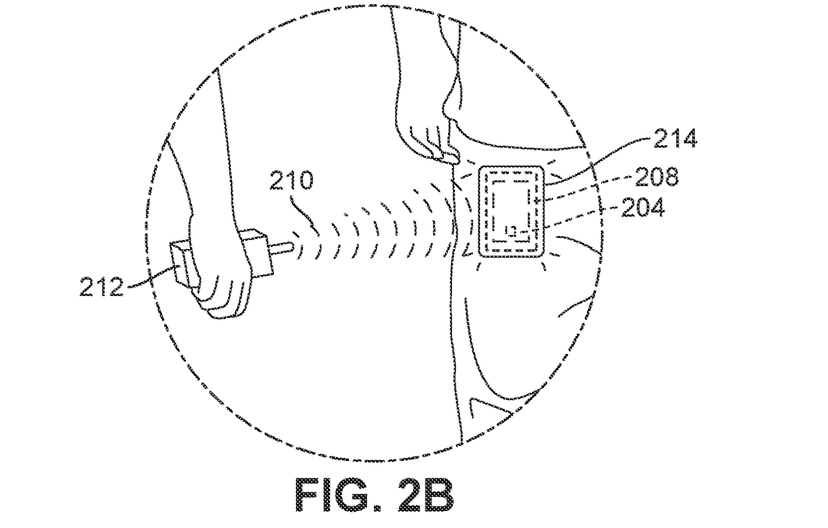

FIG. 2A and FIG. 2B illustrate an example of an unauthorized person 202 using an illicit device 212 obtaining confidential data from a chip card 208 held in a wallet in the back pocket of a pedestrian 206. As shown in scenario 200 in FIG. 2A, pedestrian 206 is waiting at a curb so that he can cross the street, for example. The outline of his wallet 214 in his back pocket is visible. Unauthorized person 202 is standing behind pedestrian 206, holding his illicit device 212 in his right hand, in fairly close proximity to wallet 214. NFC (for example) electromagnetic waves 210 emitted by illicit device 212 are directed at chip 204 in chip card 208. In that case, even though the electromagnetic waves must penetrate through the cloth covering the pedestrian's back pocket and through the leather of his wallet, electromagnetic waves 210 may nevertheless penetrate through these obstacles to read confidential data stored in chip 204 in chip card 208. Thus storing one's chip cards in wallets, purses, clothing, briefcases or other personal items may not provide sufficient protection against the theft of confidential data.

Figure 3A:
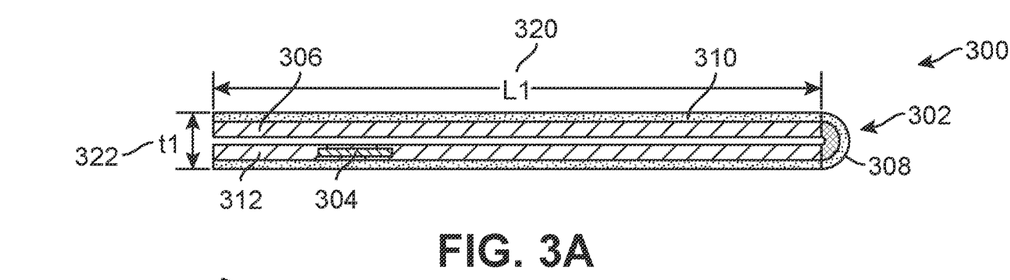
FIG. 3A, FIG. 3B and FIG. 3C are schematic diagrams of a chip card that is protected from unauthorized access, in an embodiment.
Figure 3B:
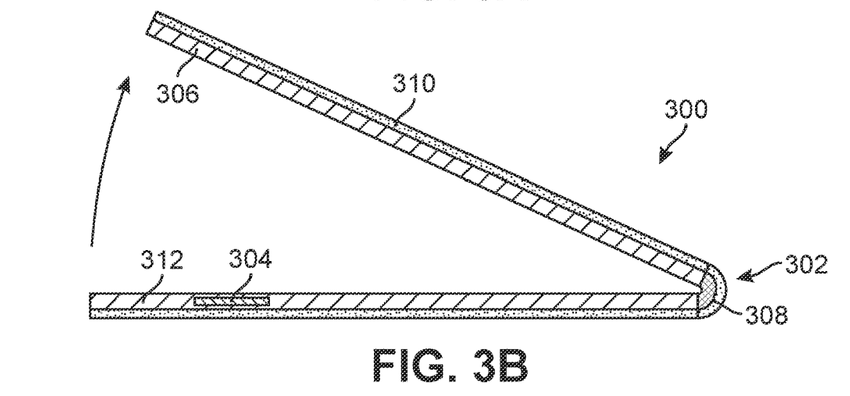
Figure 3C:
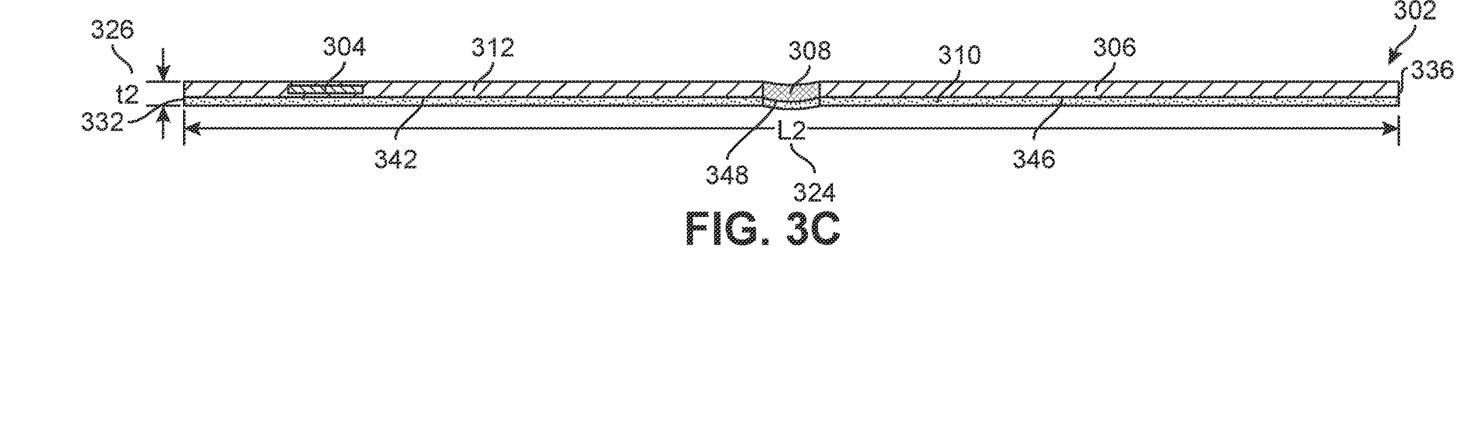

FIG. 3A, FIG. 3B and FIG. 3C are a schematic diagrams 300 of an embodiment of a chip card 302. FIG. 3A shows a folded view of chip card 302. FIG. 3B shows a view of chip card 302 as it is being unfolded. FIG. 3C shows a fully unfolded view of chip card 302. As shown in all three renditions of chip card 302 in FIG. 3A, FIG. 3B and FIG. 3C, chip card 302 has a first portion 306 and a second portion 312. First portion 306 is joined to second portion 312 by a flexible portion 308. Chip card 302 has a chip 304 in its second portion 312. Protective conductive layer 310 covers all exterior surfaces of chip card 302, including the exterior surface 346 of first portion 306, the exterior surface 348 of flexible portion 308 and the exterior surface 342 of second portion 312. As best shown in FIG. 3C, protective conductive layer 310 extends from the longitudinal outside edge 336 of first portion 306 to the longitudinal outside edge 332 of second portion 312. Flexible portion 308 allows chip card 302 to be folded over such that the entire exposed surfaces of chip card 302 are covered by protective conductive layer 310 when the chip card is folded over, as shown in FIG. 3A.

Credit and debit cards used in the United States and in some other countries typically have dimensions of 8.5 cm×5.4 cm, for example. In yet some other countries, the dimensions might be different. Identity cards may also have different dimensions. When chip card 302 is folded over as in FIG. 3A, its length L1, which is designated by the numeral 320, may be roughly half the length of a typical chip card, for example L1 may be about 4.25 cm or so, while its thickness t1, which is designated by the numeral 322 may be slightly greater than the twice the thickness of a typical chip card. When chip card 302 is fully unfolded as in FIG. 3C, its length L2, which is designated by the numeral 324, may be roughly the same as the 8.5 cm length of a typical chip card and the thickness dimension t2 in FIG. 3C would be slightly greater than the thickness of a typical credit or debit card.

Protective outer layer 310 is fabricated from a highly conductive material. For example, it could be fabricated from two polymer layers that are laminated with an aluminum, silver, copper or gold layer in between the polymer layers. It could alternatively be fabricated from a single layer of a polymer, rubber, fabric or other material that incorporates highly conductive particles, such as particles of aluminum, silver, copper or gold. It could also be fabricated from a conductive polymer, for example. Embodiments that comprise highly conductive particles may scatter as well as reflect electromagnetic waves, rather than only reflect electromagnetic waves, which could have additional benefits because scattering would further reduce the intensity of electromagnetic waves that might reach the chip or that might return to be read by an illicit device.

Figure 4:
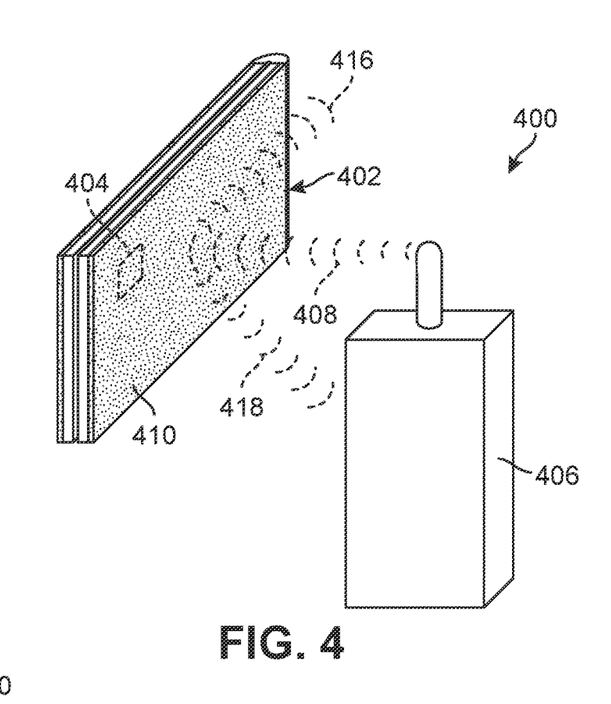
FIG. 4 is a perspective view of the embodiment of a chip card illustrated in FIG. 3A, FIG. 3B and FIG. 3C.
Figure 5:
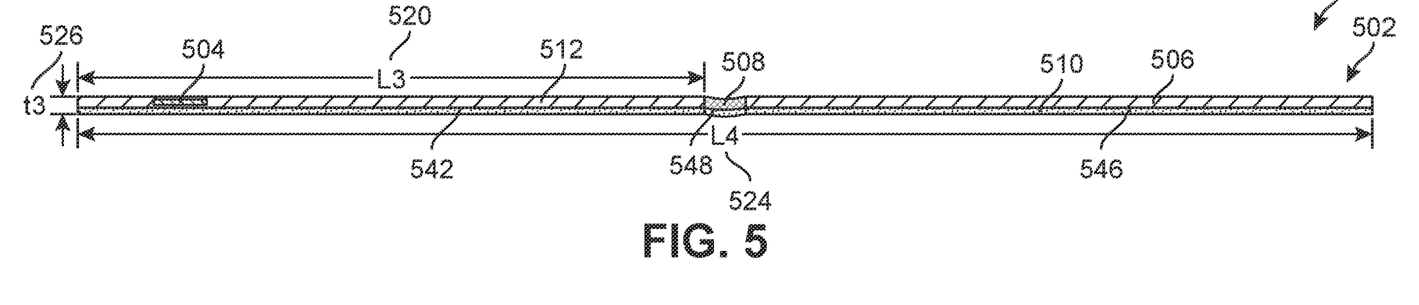
FIG. 5 is a schematic diagram of another embodiment of a chip card that is protected from unauthorized access.

FIG. 4 is a schematic diagram 400 illustrating the effect of a highly conductive outer layer 410. Because outer layer 410 on the exterior of chip card 402 is a highly conductive layer, it reflects electromagnetic waves 408 emitted by illicit device 406, such that the waves are reflected and/or scattered by highly conductive outer layer 410, in various directions, for example as shown by reflected and/or scattered electromagnetic waves 416 and reflected and/or scattered electromagnetic waves 418. Thus electromagnetic waves 408 emitted by illicit device 406 do not reach chip 404. Furthermore, any electromagnetic waves that might somehow be emitted by chip 404 would not transmit back through outer layer 410 as long as the chip card is folded over as shown in FIG. 3A, and therefore could not be read by any illicit device.

FIG. 5, FIG. 6, FIG. 7 and FIGS. 8A-C are schematic diagrams of other embodiments of chip cards that may be protected by a highly conductive outer layer from being accessed by illicit devices. These embodiments are generally similar to the embodiment shown in FIG. 3A, FIG. 3B and FIG. 3C, but each has its own characteristics. Thus the embodiment of a chip card 502 illustrated in the schematic diagram 500 of FIG. 5 has a first portion 506 that can be folded over a second portion 512 because the portion 508 joining the first portion 506 to the second portion is flexible. The exterior surface 546 of first portion 506, the exterior surface 548 of flexible portion 508 and the exterior surface 542 of second portion 512 are covered by a highly conductive outer layer 510. Thus chip 504 in the second portion 512 of chip card 502 is protected from electromagnetic penetration by highly conductive outer layer 510 as long as the chip card is folded over. When chip card 502 is fully unfolded, its length L4, which is designated by the numeral 524, would be roughly twice the length of a typical credit card. However, when chip card 502 is fully folded over, its length L3, which is designated by the numeral 520 would be roughly the same as the length of a typical credit card, such that it could fit readily into a person's wallet (in which case it would use roughly the same amount of space as two adjacent chip cards). Its unfolded thickness t3, which is designated by the numeral 526, would be roughly the same as or possibly somewhat greater than the thickness of a typical chip card. The longer dimensions of this embodiment might have the additional benefit of encouraging owners of chip cards to fold them over when putting them away. When it is folded over, the thickness of the folded chip card 502 would be roughly twice the thickness of a typical chip card, or possibly somewhat thicker.

Figure 6:
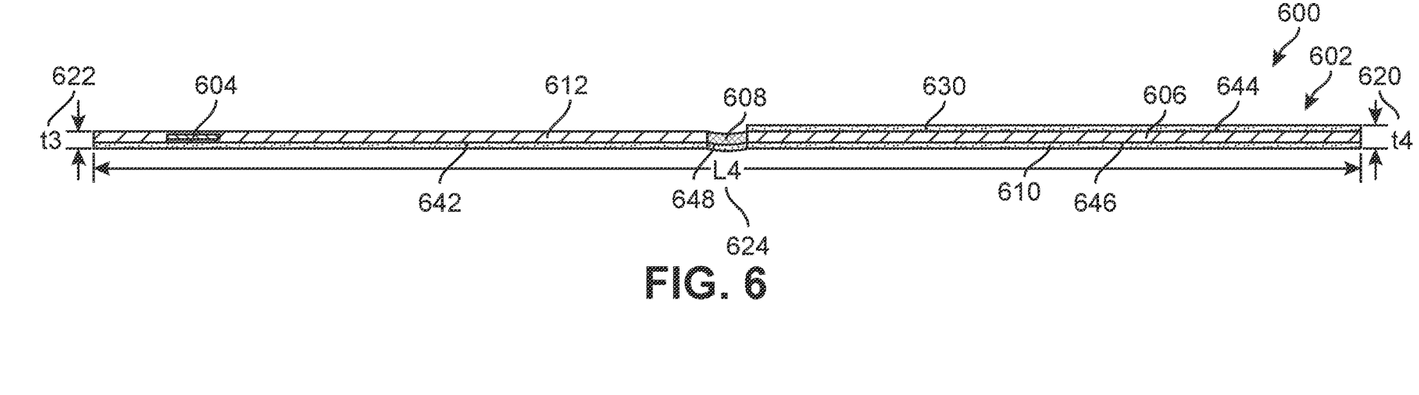
FIG. 6 is a schematic diagram of another embodiment of a chip card that is protected from unauthorized access.

The embodiment shown in the schematic diagram 600 of FIG. 6 offers an extra layer of protection against unauthorized access. That embodiment has an extra protective layer 630 of highly conductive material in addition to highly conductive protective layer 610 that extends on the exterior surface 642 of second portion 612 of chip card 602, the exterior surface 648 of flexible portion 608 of chip card 602, and the exterior surface 646 of first portion 606. That extra layer of highly conductive material 630 is disposed on the interior surface 644 of first portion 606 of chip card 602. Thus, when chip card 602 is in its folded over configuration, electromagnetic waves directed towards exterior surface 646 of first portion 606 may need to penetrate through two highly conductive layers, layer 630 and layer 610, in order to reach chip 604. In this embodiment, the overall length L4 of the unfolded chip card designated by the numeral 624 may be either roughly the length of a typical chip card as in the embodiment of FIG. 3C, or it may be roughly twice the length of a typical chip card as in the embodiment of FIG. 5. The overall thickness t3 (which is designated by the numeral 622) of the second portion of the chip card would be roughly the same as or possibly somewhat greater than the thickness of a typical chip card. The thickness t4 (which is designated by the numeral 620) of the first portion of the chip may be somewhat greater than the thickness of a typical chip card or it may be roughly the same.

Figure 7:
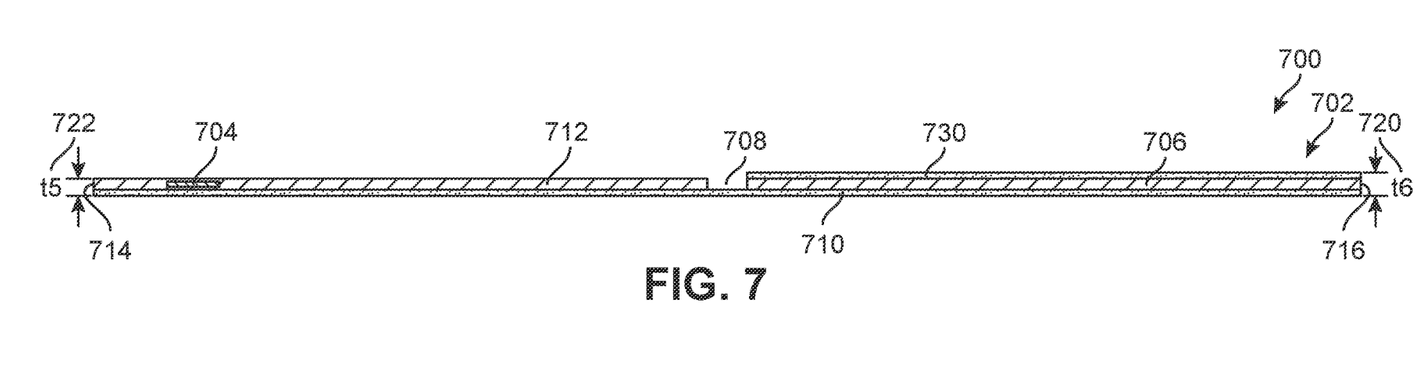
FIG. 7 is a schematic diagram of another embodiment of a chip card that is protected from unauthorized access.

The embodiment shown in the schematic diagram 700 of FIG. 7 has a gap 708 between first portion 706 of chip card 702 and second portion 712 of chip card 702. Chip 704 is embedded in second portion 712 of chip card 702. This embodiment has a highly conductive protective layer 710 which extends from the outer edge 714 of second portion 712 to the outer edge 716 of first portion 706. In this embodiment, highly conductive protective layer 710 provides the mechanical structure that joins first portion 706 of chip card 702 to second portion 712 of chip card 702. Gap 708 allows first portion 706 to be folded over second portion 712. Because in this embodiment protective layer 710 may be thicker than in the embodiments of FIG. 3C, FIG. 5 or FIG. 6, the thickness t5, designated by numeral 722, may be somewhat greater than the thickness t3 of the FIG. 6 embodiment, and the thickness t6, designated by numeral 720, may be somewhat greater than the thickness t4 of the FIG. 6 embodiment. Also, additional protective layer 730, shown on top of first portion 706, is optional in this embodiment.

Figure 8A:
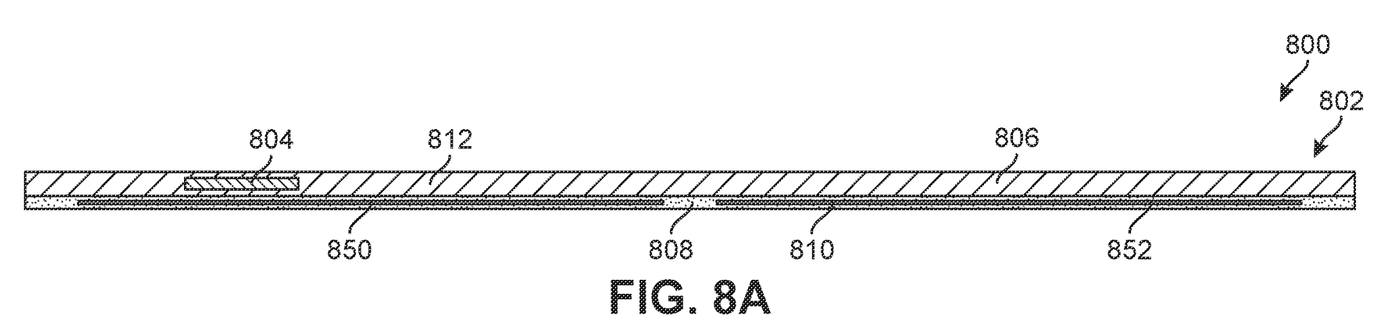
FIG. 8A, FIG. 8B, and FIG. 8C illustrate a schematic diagram of another embodiment of a chip card that is protected from unauthorized access.
Figure 8B:
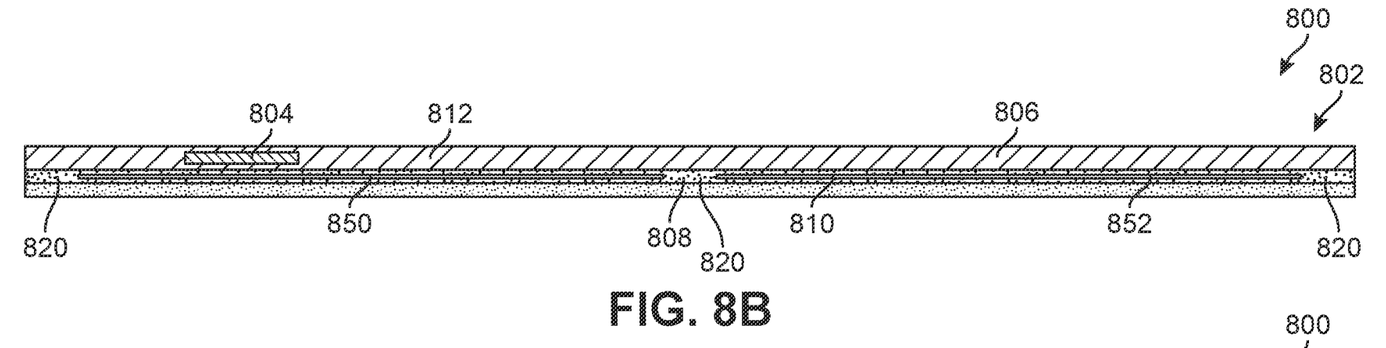
Figure 8C:
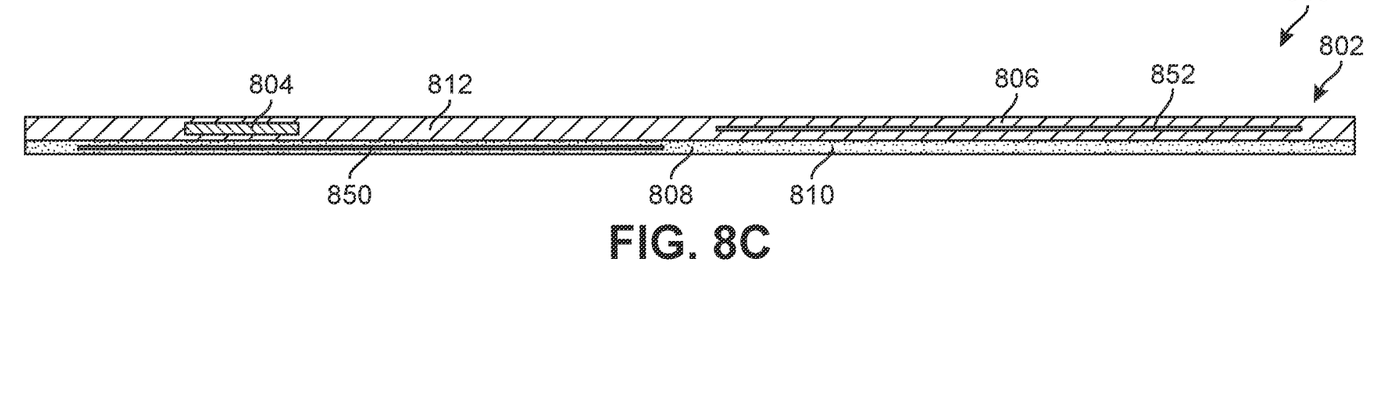

Another embodiment, which is shown in the schematic diagrams 800 of FIGS. 8A-8C, has a chip card 802 which is entirely made of a flexible material, except for stiffening structure(s) 850. In this embodiment, the flexible material forms the body of chip card 802 and includes a first portion 806 and a second portion 812. With this configuration, the flexible material forming the body of chip card 802 allows first portion 806 to be folded over second portion 812. In an example embodiment, the flexible material forming the body is monolithic such that first portion 806 is continuous with second portion 812. In some embodiments, the flexible material forming the body may be made of silicone, rubber, or other flexible materials.

This embodiment of flexible chip card 802 has a highly conductive protective layer 810 that covers the exterior surface of the body of chip card 802, including the exterior surfaces of both first portion 806 and second portion 812. In an example embodiment, highly conductive protective layer 810 is continuous across the exterior surfaces of both first portion 806 and second portion 812. Highly conductive protective layer 810 is substantially similar to protective layer 310 and may be made of any of the materials described above.

In some embodiments, flexible chip card 802 may include one or more stiffening structures configured to provide rigidity to chip card 802. That is, the flexible material forming the body of chip card 802 may not have sufficient rigidity on its own to prevent chip card 802 from bending or flopping when being inserted into a card reader, potentially causing problems for some card readers to read chip card 802. In an example embodiment, one or more stiffening structures 850 may be included in chip card 802 to provide rigidity to allow chip card 802, or at least a portion containing a chip 804, to be inserted into a card reader. In this embodiment, stiffening structure(s) 850 are located in the second portion 812 of the chip card 802 that has chip 804, while the first portion 806 of chip card 802 may optionally incorporate a stiffening structure 852. Thus in one embodiment, stiffening structure(s) 850 are used in the second portion 812 of chip card 802, but no stiffening structures are used in the first portion 806 of chip card 802.

In an optional alternative embodiment, chip card 802 may have stiffening structure(s) 850 in the second portion 812 of chip card 802 and additional stiffening structure(s) 852 in the first portion 806 of chip card 802. In the latter embodiment, a gap 808 is located between the stiffening structure(s) 850 and stiffening structures 852, so that chip card 802 may be folded over at gap 808. Stiffening structure(s) 850 and stiffening structure(s) 852 may be a single structure, such as a thin, stiff rectangular structure, or may be multiple structures, such as two or more elongated structures that provide sufficient stiffness to chip card 802 so that it may be readily inserted into a chip reader. In some embodiments, stiffening structure(s) 850 and stiffening structure(s) 852 may be made of a rigid material, for example, plastic, polymer, carbon fiber plate, metal, such as titanium or steel, and combinations thereof, as well as any other rigid material.

In some embodiments, stiffening structure(s) 850 and/or stiffening structure(s) 852 may be incorporated into or embedded in highly conductive protective layer 810, as shown in FIG. 8A. For example, in FIG. 8A stiffening structure(s) 850 and/or stiffening structure(s) 852 are covered and surrounded by highly conductive protective layer 810. In other embodiments, stiffening structure(s) 850 and/or stiffening structure(s) 852 may be located between the flexible material forming the body of chip card 802 and highly conductive protective layer 810, as shown in FIG. 8B. For example, in FIG. 8B, stiffening structure(s) 850 and/or stiffening structure(s) 852 are located between first portion 806 and second portion 812 on one side and highly conductive protective layer 810 on the other, opposite side. Additionally, in the embodiment of FIG. 8B, one or more gaps (e.g., gap 808) between the flexible material forming the body of chip card 802 and highly conductive protective layer 810 may be filled in using a flexible sealant material 820. Flexible sealant material 820 may be a polymer, epoxy, or other similar material that may be used to seal or close stiffening structure(s) 850 and/or stiffening structure(s) 852 between first portion 806 and second portion 812 and highly conductive protective layer 810.

In still other embodiments, flexible chip card 802 may include stiffening structure(s) 850 incorporated into or embedded in highly conductive protective layer 810 and stiffening structure(s) 852 incorporated into or embedded in the flexible material of first portion 806 of the body of chip card 802 or incorporated into or embedded in highly conductive protective layer 810, as shown in FIG. 8C.

With this arrangement, the embodiments of chip card 802 shown in the schematic diagrams 800 of FIGS. 8A-8C may be completely waterproof to protect the functionality of chip 804 from exposure to water or other liquids. In an example embodiment, chip card 802 shown in FIGS. 8A-8C may be waterproof to at least three atmospheres of pressure. A chip card owner may take waterproof chip card 802 to places where it may be exposed to liquids, such as a pool, the beach, diving, etc. and have confidence that chip card 802 will continue to function properly after being exposed or submerged in liquid.

Figure 9A:
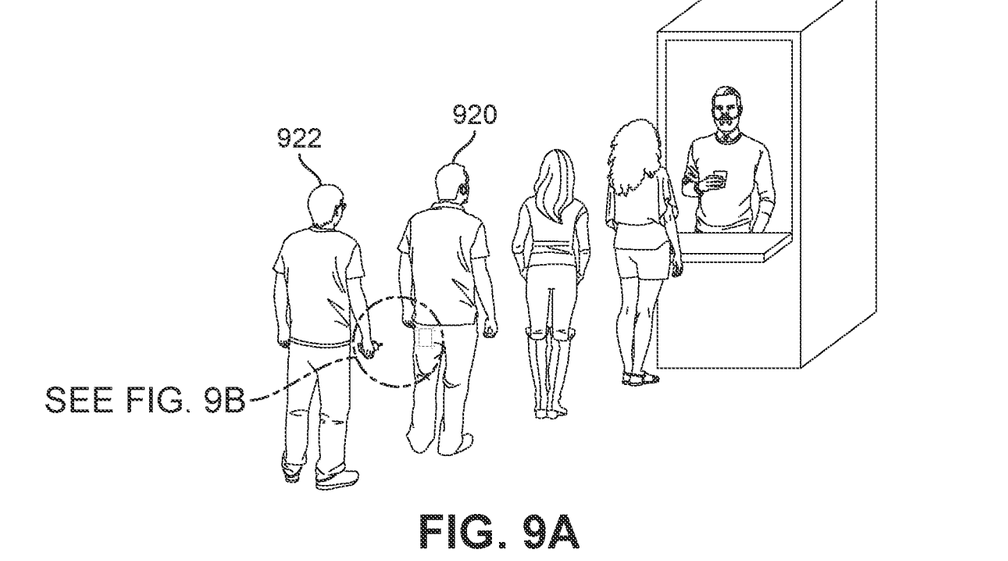
FIG. 9A and FIG. 9B illustrate a scenario in which an unauthorized person is prevented from using an illicit device to obtain information from a chip card.
Figure 9B:
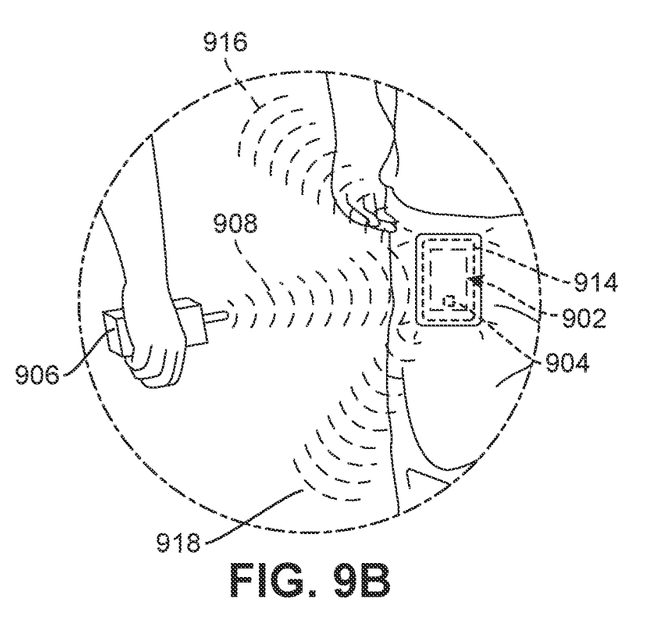

FIG. 9A and FIG. 9B are schematic illustrations showing how an attempt at accessing a chip 904 in a chip card 902 may be thwarted. In the example shown in FIG. 9A and FIG. 9B, chip card 902 may be any of the chip cards described above with reference to FIG. 3A, FIG. 3B, FIG. 3C, FIG. 5, FIG. 6, FIG. 7 or FIGS. 8A-C. Chip card owner 920 has a chip card 902 in his wallet 914, which is visible in his back pocket. A person 922 is holding an illicit device 906, which is directing electromagnetic waves 908 at the chip card 902 in the chip card owner's back pocket. The electromagnetic waves 908 directed from illicit device 906 towards chip 904 in chip card 902 are reflected by the highly conductive protective layer (not shown) on chip card 902. FIG. 9 shows electromagnetic waves 916 and electromagnetic waves 918 that have been reflected by the highly conductive protective layer on chip card 902. The electromagnetic waves 908 are prevented from reaching or accessing chip 904, so that illicit device 906 is prevented from obtaining any information from chip 904. Although in this example chip card owner 920 likely has no idea that an attempt has been made to obtain his confidential information, he has been protected from this attempt by the protective layer on the exterior surfaces of his chip card 902.

In the various embodiments described above, the highly conductive protective layers may be coated onto the chip cards, may be laminated with the chip cards, may be printed on the chip cards, may be attached to the chip cards using adhesives or may be applied to the chip cards using other methods or technologies. In any event, all possible methods of attaching, affixing or incorporating a protective layer can be used to fabricate the various embodiments described above.

While various embodiments have been described above, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A chip card comprising:
a first portion of the chip card and a second portion of the chip card;
the first portion of the chip card and the second portion of the chip card being made from a flexible material such that the first portion can be folded over the second portion, wherein the first portion of the chip card has an exterior surface and the second portion of the chip card has an exterior surface;
a chip embedded in the second portion of the chip card, wherein the chip is configured to be read by a chip reader; and a highly conductive protective layer, wherein the highly conductive protective layer covers each of:
(i) the exterior surface of the first portion of the chip card, and
(ii) the exterior surface of the second portion of the chip card; and
wherein the highly conductive protective layer is configured to reflect or scatter electromagnetic waves.

2. The chip card according to claim 1, wherein the highly conductive protective layer is a continuous layer forming an outer layer of the chip card.

3. The chip card according to claim 1, wherein the flexible material forming the first portion and the second portion is monolithic such that the first portion is continuous with the second portion.

4. The chip card according to claim 1, further comprising at least one stiffening structure disposed in the flexible material, wherein the stiffening structure provides rigidity to the chip card.

5. The chip card according to claim 1, wherein the chip card is waterproof to at least three atmospheres of pressure.

6. The chip card according to claim 1, wherein the flexible material comprises silicone.

7. The chip card according to claim 1, wherein the highly conductive protective layer is a polymer layer comprising highly conductive particles.

8. A chip card comprising:
a first portion of the chip card comprised of a flexible material;
a second portion of the chip card comprised of a flexible material;
a chip embedded in the second portion of the chip card configured to be read by a chip reader;
a highly conductive protective layer disposed over an exterior surface of the first portion and an exterior surface of the second portion; and
at least one stiffening structure disposed in the second portion, the at least one stiffening structure providing rigidity to the chip card;
wherein when the first portion of the chip card is folded over the second portion of the chip card the highly conductive protective layer extends from a first end of the chip card over the first portion of the chip card and over the second portion of the chip card to a second end of the chip card to form an outer layer of the chip card; and
wherein the highly conductive protective layer is configured to reflect or scatter electromagnetic waves.

9. The chip card according to claim 8, wherein the highly conductive protective layer is continuous across the exterior surface of the first portion and the exterior surface of the second portion.

10. The chip card according to claim 8, wherein the at least one stiffening structure is embedded in the highly conductive protective layer disposed over the exterior surface of the second portion.

11. The chip card according to claim 8, wherein the at least one stiffening structure is disposed between the flexible material of the second portion and the highly conductive protective layer.

12. The chip card according to claim 8, further comprising at least one additional stiffening structure disposed in the first portion of the chip card.

13. The chip card according to claim 12, wherein the at least one additional stiffening structure is embedded in the highly conductive protective layer disposed over the exterior surface of the first portion.

14. The chip card according to claim 12, wherein the at least one stiffening structure is disposed between the flexible material of the first portion and the highly conductive protective layer.

15. The chip card according to claim 12, wherein the at least one stiffening structure is embedded in the flexible material of the first portion.

16. A chip card comprising:
a first portion of the chip card;
a second portion of the chip card;
a chip embedded in the second portion of the chip card configured to be read by a chip reader;
the first portion of the chip card and the second portion of the chip card being made from a flexible material such that the first portion can be folded over the second portion, wherein the first portion of the chip card has an exterior surface and the second portion of the chip card has an exterior surface;
a first stiffening structure disposed in the second portion of the chip card and a second stiffening structure disposed in the first portion of the chip card, the first stiffening structure and the second stiffening structure separated by a gap, wherein the first portion is configured to be folded over the second portion at the gap; and
a highly conductive protective layer disposed over the exterior surface of the first portion and the exterior surface of the second portion;
wherein the highly conductive protective layer is configured to reflect or scatter electromagnetic waves.

17. The chip card according to claim 16, wherein the first stiffening structure and the second stiffening structure are formed of a rigid material.

18. The chip card according to claim 17, wherein the rigid material comprises one or more of plastic, polymer, carbon fiber plate, titanium, or steel.

19. The chip card according to claim 16, wherein the highly conductive protective layer comprises highly conductive particles.

20. The chip card according to claim 16, wherein the first stiffening structure is embedded in the highly conductive protective layer disposed over the exterior surface of the second portion; and
wherein the second stiffening structure is embedded within the flexible material forming the first portion of the chip card.

* * * * *